United States Patent [19]

Niemelä

[11] Patent Number: 4,513,982
[45] Date of Patent: Apr. 30, 1985

[54] SLEDGE OR EQUIVALENT TRANSPORTING BASE

[76] Inventor: Pekka Niemelä, Säpikäsmutka 2 A, 96440 Rovaniemi 44, Finland

[21] Appl. No.: 445,736

[22] Filed: Nov. 30, 1982

[30] Foreign Application Priority Data

Dec. 15, 1981 [FI] Finland ................... 814017

[51] Int. Cl.³ ............................................. B62B 13/00
[52] U.S. Cl. ...................................... 280/26; 108/137; 280/80 B
[58] Field of Search .................... 280/26, 80 B, 24, 27, 280/15; 108/137 X, 102; 414/525 A; 248/424; 298/12

[56] References Cited

U.S. PATENT DOCUMENTS 437,885  10/1890  Bryant .................... 298/12

FOREIGN PATENT DOCUMENTS 45936   1/1968  Finland .
1170612 1/1952  France .................... 280/80 B Primary Examiner—Joseph F. Peters, Jr.
Assistant Examiner—Joseph G. McCarthy

[57] ABSTRACT

A sledge or equivalent transporting base, consisting of a frame (1) and of thereinunder mounted travelling members such as runners (2), with reference to which the frame is movable in the direction longitudinal to the sledge. To the runner (2) has been pivotally attached an arc-shaped rolling member (3) with the center-point of its radius at the pivotal point and which is free to roll along an opposed counterface (5) on the frame (1). With the aid of the invention, sledge runners which have frozen fast to snow or ice can be easily freed by first backing up so that the load rolls into its rear position, whereafter the sledge is started, whereby with the aid of the load's mass the runners are jerked free from frozen-on snow and ice.

3 Claims, 4 Drawing Figures

SLEDGE OR EQUIVALENT TRANSPORTING BASE

The present invention concerns a sledge or equivalent transporting base consisting of a frame and of travelling members such as runners mounted under the frame, the frame being longitudinally movable with reference to these members.

A sledge of this kind is disclosed for instance in the Finnish Pat. No. 45936. This sledge suffers from the drawback that owing to the action of its pivoted arms the load is set not only into horizontal movement but also in a minor vertical movement. When one or both pivoted arms turn into their vertical position, the load rises, and force is required herefor. In the case that the runners of the sledge freeze to the ground, all force that is ever available is needed to put the sledge in motion.

The object of the invention is to facilitate even further the starting of sledges, especially in cases when the runners tend to freeze fast to snow or ice. The sledge of the invention is characterized in that to the runner has been pivotally attached an arc-shaped rolling member which has the centre-point of its radius located at the pivotal point and which is free to roll along an opposite counterface on the frame. By the aid of the invention, the load on the runners of the sledge can be set into a horizontal motion, whereby it becomes easy to jerk the sledge into motion. To accomplish this, one should at first back enough to make the load move as far as possible to the rear, rolling along the rolling surface. When starting, the load will readily roll back along the rolling surface, and the mass is thereby put in motion, whereafter it is easy to jerk the runners free.

An advantageous embodiment of the invention is characterized in that between the rolling member and the counterface have been provided two retaining ropes, the ends of one of these ropes being fixed to the front end of the rolling member and to the rear end of the opposite surface and those of the other rope, to the rear end of the rolling member and to the front end of the opposite surface. The runners are hereby held contiguous with the frame, and no complex attachments are needed.

Another embodiment of the invention is characterized in that the rolling member consists of U-profiled material, with the ropes located between its flanges. As a result, the ropes are held in their place and they are well protected against snow and other splashings.

A third embodiment of the invention is characterized in that the counterface consists of a U profile section, the rolling member rolling within its flanges. Hereby the rolling surface will lie protected and it is always well guided under the frame.

The invention is described with the aid of an example in the following, referring to the attached drawing, wherein FIG. 1 presents a sledge with one pair of runners.

FIG. 2 presents a sledge with two pairs of runners.

Figure 1:
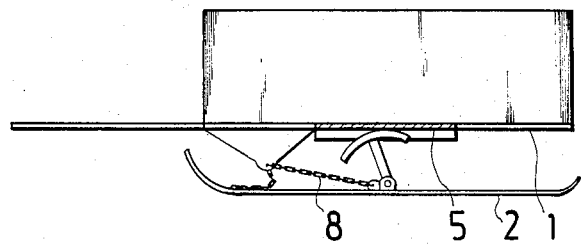
Figure 2:
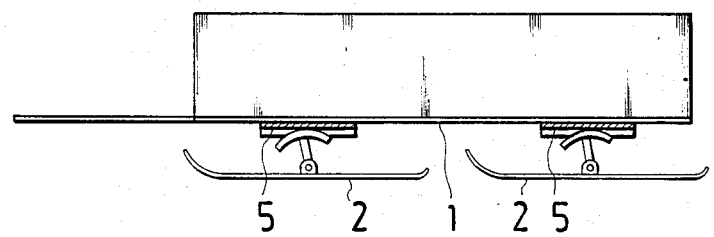
Figure 3:
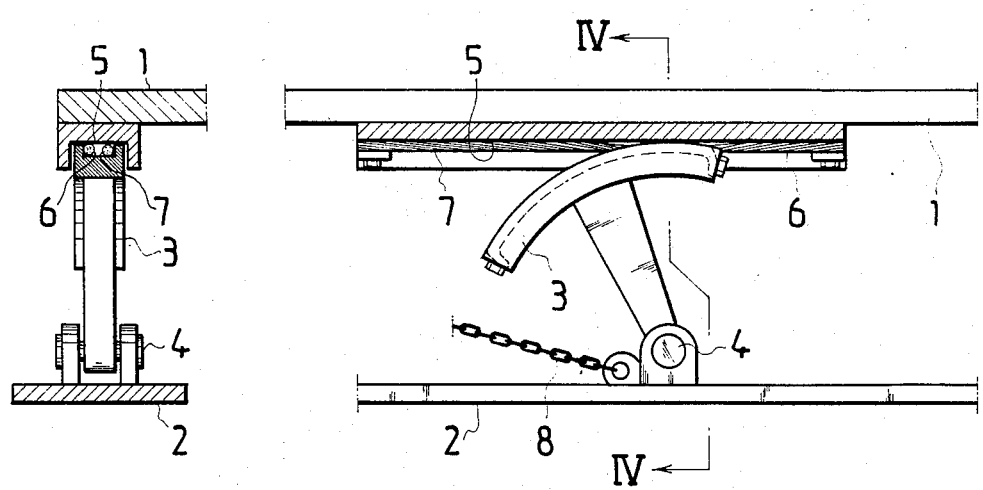
FIG. 3 shows the rolling member interposed between the sledge frame and the runner.
Figure 4:
FIG. 4 shows the section along the line IV—IV in FIG. 3.

The sledge consists of a frame 1 and of runners 2 mounted under the frame, with reference to which the frame is movable in the longitudinal direction of the sledge. To the runner 2 has been pivotally attached an arc-shaped rolling member 3 which has the centre-point 4 of its radius at the pivotal point. The rolling member 3 is free to roll along an opposed counterface 5 on the frame 1. Between the rolling member 3 and the counterface 5 have been provided retaining wires ropes 6,7 mounted side by side. The ends of one rope 6 are affixed at the front end of the rolling member 3 and at the rear end of the counterface 5. The ends of the other rope 7 are affixed to the rear end of the rolling member 3 and to the front end of the counterface 5. The rolling member consists of material with U profile, the ropes being disposed within its flanges. The counterface 5 consists of U profile section, the rolling member 3 rolling within its flanges.

When the runners freeze fast to snow or ice, one should back up so that the load is freely allowed to roll rearward in the horizontal plane, thanks to the rolling member 3. When starting to travel thereafter, the load is first set in motion with the aid of the rolling member 3, and which motion later on e.g. by mediation of a chain 8 gives a jerk to the runners, whereby the sledge will start to move.

It is obvious to a person skilled in the art that different embodiments of the invention may vary within the scope of the claims following below.

I claim:

1. Sledge or equivalent transporting base consisting of a frame, at least one runner mounted under the frame, with reference to which the frame is movable longitudinally, an arc-shaped rolling member pivotally attached to the runner which has the center point of its radius located at the pivotal point and which is free to roll along an opposed counterface on the frame, and retaining ropes placed side by side provided between the rolling member and the counterface, the ends of one of said ropes being affixed at the front end of the rolling member and at the rear end of the counterface and the ends of the other rope being affixed at the rear end of the rolling member and at the front end of the counterface.

2. Sledge according to claim 1, wherein the rolling member consists of material with U profile, the ropes being disposed within its flanges.

3. Sledge according to claim 1, wherein the counterface consists of a U profiled section, the rolling member rolling within its flanges.

* * * * *